(12) United States Patent
Wetzel et al.

(10) Patent No.: US 10,108,950 B2
(45) Date of Patent: Oct. 23, 2018

(54) SYSTEM AND METHOD FOR PROVIDING A GROUP ACCOUNT

(71) Applicant: Capital One Financial Corporation, McLean, VA (US)

(72) Inventors: Christopher Wetzel, Wayne, PA (US); Daniel Beck, Arlington, VA (US); Paul Young Moreton, Glen Allen, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 428 days.

(21) Appl. No.: 14/824,558

(22) Filed: Aug. 12, 2015

(65) Prior Publication Data

US 2016/0048823 A1 Feb. 18, 2016

Related U.S. Application Data

(60) Provisional application No. 62/036,313, filed on Aug. 12, 2014.

(51) Int. Cl.
*G06Q 20/22* (2012.01)
*G06Q 50/00* (2012.01)
*G06Q 20/32* (2012.01)
*G06Q 20/40* (2012.01)

(52) U.S. Cl.
CPC ............ *G06Q 20/29* (2013.01); *G06Q 20/32* (2013.01); *G06Q 20/405* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 8,150,844 B2* | 4/2012 | Redstone | ............ | G06F 17/3087 707/724 |
| 8,401,968 B1* | 3/2013 | Schattauer | ......... | G06Q 20/3255 235/380 |
| 2003/0135438 A1* | 7/2003 | Blagg | .................... | G06Q 20/04 705/35 |
| 2008/0228637 A1* | 9/2008 | Scipioni | ................. | G06Q 20/04 705/39 |
| 2009/0132365 A1* | 5/2009 | Gruenhagen | ..... | G06F 17/30699 705/14.69 |

(Continued)

*Primary Examiner* — Chikaodinaka Ojiaku
(74) *Attorney, Agent, or Firm* — Troutman Sanders LLP; Christopher J. Forstner; John A. Morrissett (57) ABSTRACT

Systems and methods include a group fund processor having a communications interface that receives account data associated with a primary account from a device over a network, creates a group fund account, and associate one or more limits with the group fund account based on at least one selection received from the device, an alert interface that transmits an electronic invitation including a description of a first amount to an invited user over the network and receives a response from the invited user to the at least one invitation via the network, wherein the response includes account data associated with a respective group member account of the invited user; and an account processor that links the group fund account to the primary account so that the group fund account may fund the first account, and links respective group member account of the invited user to the group fund account so that the first amount is transferred from the respective group member account of the invited user to the group fund account.

6 Claims, 5 Drawing Sheets

(56) References Cited

U.S. PATENT DOCUMENTS

| | | | |
|---|---|---|---|
| 2010/0256982 A1* | 10/2010 | Bhagchandani | G06Q 30/02 705/1.1 |
| 2010/0274625 A1* | 10/2010 | Carlson | G06Q 20/202 705/14.3 |
| 2011/0087547 A1* | 4/2011 | Amaro | G06Q 30/02 705/14.53 |
| 2011/0161191 A1* | 6/2011 | Shen | G06Q 30/02 705/26.1 |
| 2011/0179064 A1* | 7/2011 | Russo | G06Q 10/10 707/769 |
| 2011/0238474 A1* | 9/2011 | Carr | H04W 4/029 705/14.23 |
| 2012/0101881 A1* | 4/2012 | Taylor | G06Q 20/12 705/14.13 |
| 2012/0109749 A1* | 5/2012 | Subramanian | G06Q 30/0255 705/14.53 |
| 2012/0130863 A1* | 5/2012 | Tedjamulia | G06Q 30/0224 705/27.1 |
| 2012/0150605 A1* | 6/2012 | Isaacson | G06Q 20/10 705/14.25 |
| 2012/0239569 A1* | 9/2012 | Solomon | G06Q 20/108 705/42 |
| 2012/0296724 A1* | 11/2012 | Faro | G06Q 30/00 705/14.27 |
| 2013/0091213 A1* | 4/2013 | Diab | G06Q 50/01 709/204 |
| 2013/0173467 A1* | 7/2013 | Nuzzi | G06Q 20/3224 705/44 |
| 2013/0211913 A1* | 8/2013 | Ross | G06Q 30/02 705/14.53 |
| 2013/0304576 A1* | 11/2013 | Berland | G06Q 50/01 705/14.53 |
| 2014/0222636 A1* | 8/2014 | Cheng | G06Q 50/01 705/35 |
| 2016/0350848 A1* | 12/2016 | Acharya | G06Q 40/02 |

* cited by examiner

SYSTEM AND METHOD FOR PROVIDING A GROUP ACCOUNT

RELATED APPLICATIONS

This application contains subject matter related to and claims the benefit of U.S. Provisional Patent Application No. 62/036,313, filed on Aug. 12, 2014, the entire contents of which is incorporated herein by reference in its entirety.

The present application contains subject matter related to U.S. patent application Ser. No. 14/031,263 entitled "System and Method for Determining Social Statements," U.S. Provisional Patent Application No. 61/914,719 entitled "System and Method for Financial Transfers from a Financial Account Using Social Media," and U.S. Provisional Patent Application No. 61/737,399 entitled "System and Method for Synching a Financial Account with a Social Network Account," the contents of which are incorporated by reference in their entirety.

This application contains subject matter related to U.S. patent application Ser. No. 14/827,608 entitled "System and Method For Digital Authentication," filed on Aug. 17, 2015 and U.S. patent application Ser. No. 14/827,671, entitled "System and Method For Digital Authentication," filed on Aug. 17, 2015, both of which claim priority to U.S. Provisional Patent Application No. 62/037,710, filed on Aug. 15, 2014, the entire contents of each of which are incorporated herein by reference.

FIELD OF THE DISCLOSURE

The present disclosure relates to systems and methods for integrating a social network application programming interface to provide a group fund account to pay for purchases that satisfy certain parameters.

BACKGROUND OF THE DISCLOSURE

Friends and family members often organize events, outings, vacations, and other activities as a group. These activities are often paid for by one member of the group, and then that group member has to collect funds from the rest of the group for their allocated portion of the expenses incurred. As the size of these groups grow, the ability to accurately track and allocate expenses becomes increasingly difficult. Collecting, summarizing, communicating and collecting payment for expenses is an awkward and time consuming practice.

These and other drawbacks exist.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION OF THE EMBODIMENTS

The following description is intended to convey a thorough understanding of the embodiments described by providing a number of specific example embodiments and details involving systems and methods for a group card fund to pay for purchases that satisfy certain parameters. A financial institution may permit account holders ("Executors") to create a short term deposit account ("Group Card Fund"), link it to or otherwise associate it with to their financial account, invite specific friends to add money to the Group Card Fund, and withdraw money from the Group Card Fund to pay for card charges that satisfy specific purchase parameters (i.e. purchases occurring in a specific geographic location and/or during a specified period of time). The purpose of this Group Card Fund is to allow groups of people to contribute funds towards upcoming shared transactions (i.e. a group trip, a bachelor/bachelorette party, a night out, a family reunion).

The Executor will pay for expenses for the group via his/her financial account (that was previously linked to the Group Card Fund) and will be reimbursed for those expenses from the Group Card Fund. Once the funds in the Group Card Fund are depleted, or reach a certain level (i.e. below $100), the system would notify the Executor and other individuals associated with the group spending activity, and include the option of sending a request to the members of the group for more money. When the members of the group receive the request message, the message may be configured to allow them to approve the funding request for the amount the Executor has asked for, or deny the request. Upon request approval, the financial institution would withdraw the approved funds from the group members' accounts and deposit those funds into the Group Card Fund.

Group Card Fund management, group invitations, money transfer approvals from group member to Executor, and additional fund requests by Executor could all be accomplished via widely adopted social media platforms leveraged by consumers and businesses including, but not limited to, Facebook, Twitter, Google+, LinkedIn, etc., or via a domain owned and operated by the financial institution.

Figure 1:
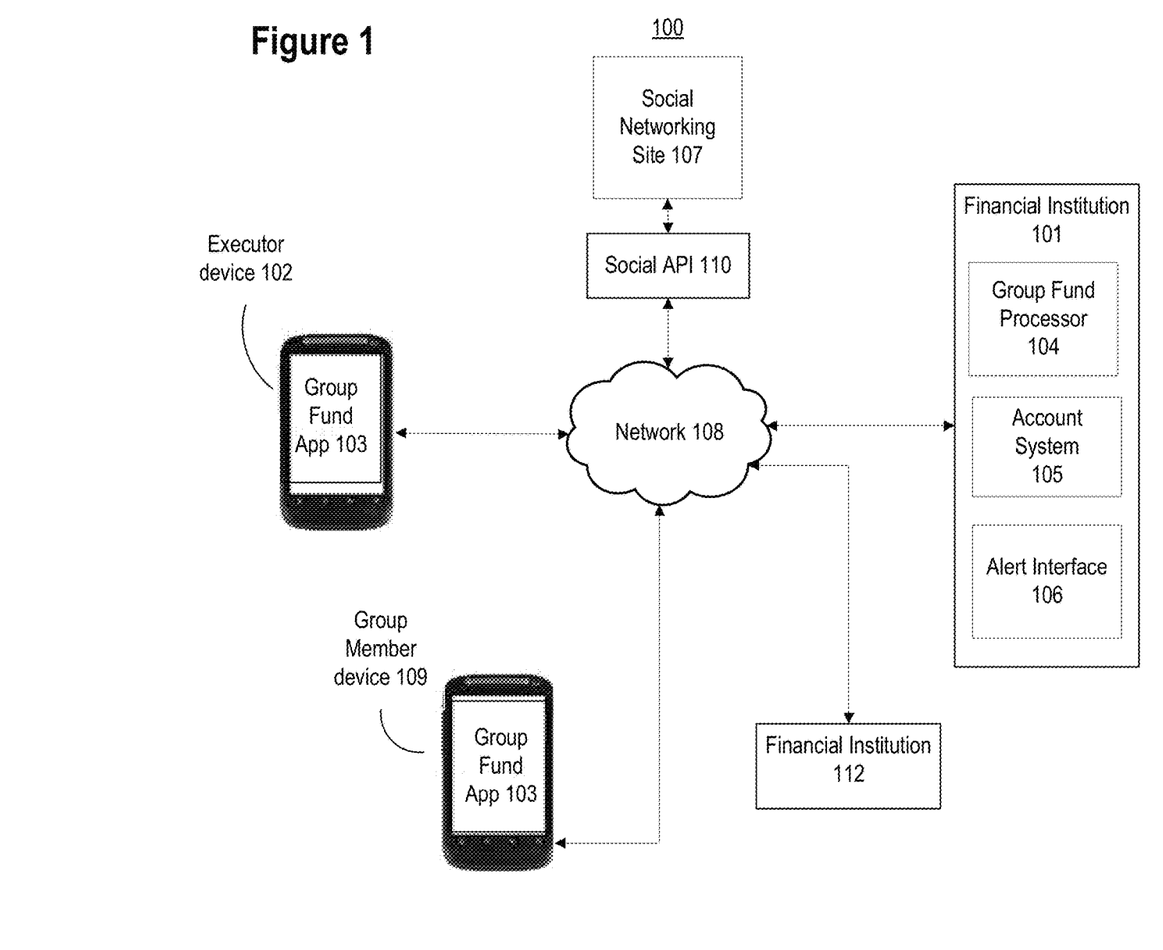
FIG. 1 depicts a schematic diagram of a system for providing a group fund account to a group of users, according to an example embodiment of the disclosure.

FIG. 1 depicts an example embodiment of a system for providing a group card fund to pay for purchases that satisfy certain parameters according to various embodiments of the disclosure. The system may include various network-enabled computer systems, including, as depicted in FIG. 1 for example, a financial institution 101, comprising a group fund processor 104, an account system 105, and an alert interface 106; a social networking site 107, a social linking application programming interface (API) 110, one or more devices, including Executor device 102 and Group member device 109, financial institution 112, and network 108, which may be included as separate processors or combined into a single processor or device having the multiple processors. As used herein, the term "module" may be understood to refer to computer executable software, firmware, hardware, or various combinations thereof. It is noted that the modules are examples. The modules may be combined, integrated, separated, or duplicated to support various applications. Also, a function described herein as being performed at a particular module may be performed at one or more other modules and by one or more other devices instead of or in addition to the function performed at the particular module. Further, the modules may be implemented across multiple devices or other components local or remote to one another. Additionally, the modules may be moved from one device and added to another device, or may be included in both devices.

In the example embodiment shown in FIG. 1, the components of financial institution 101 (e.g., group fund processor 104, account system 105 and alert interface 106) may be integrated into financial institution 101. The components of financial institution 101 (e.g., group fund processor 104, account system 105 and alert interface 106) also may be separate from financial institution 101. In various embodiments the components of financial institution 101 (e.g., group fund processor 104, account system 105 and alert interface 106) may be integrated, in whole or in part, into social networking site 107 and/or financial institution 112. Financial institutions 101 and 112, the components 104-106, and/or social networking site 107 may comprise one or more network-enabled computers. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network.

The components depicted in FIG. 1 may store information in various electronic storage media. Electronic information, files, and documents may be stored in various ways, including, for example, a flat file, indexed file, hierarchical database, relational database, such as a database created and maintained with software from, for example, Oracle® Corporation, Microsoft® Excel file, Microsoft® Access file, or any other storage mechanism.

The components depicted in FIG. 1 may be coupled via one or more networks, such as, for example, network 108. Network 108 may be one or more of a wireless network, a wired network or any combination of wireless network and wired network. For example, network 108 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving a data signal.

In addition, network 108 may include, without limitation, telephone lines, fiber optics, IEEE Ethernet 902.3, a wide area network ("WAN"), a local area network ("LAN"), or a global network such as the Internet. Also network 108 may support an Internet network, a wireless communication network, a cellular network, or the like, or any combination thereof. Network 108 may further include one network, or any number of the example types of networks mentioned above, operating as a stand-alone network or in cooperation with each other. Network 108 may utilize one or more protocols of one or more network elements to which they are communicatively coupled. Network 108 may translate to or from other protocols to one or more protocols of network devices. Although network 108 is depicted as a single network, it should be appreciated that according to one or more embodiments, network 108 may comprise a plurality of interconnected networks, such as, for example, the Internet, a service provider's network, a cable television network, corporate networks, and home networks.

In various example embodiments, an account holder may be any individual or entity that desires to conduct a financial transaction using one or more accounts held at one or more financial institutions, such as financial institution 101. The users of Executor device 102 and group member device 109 may be account holders at financial institution 101, financial institution 112, and/or another third party financial institution. Also, an account holder may be a computer system associated with or operated by such an individual or entity. An account may include any place, location, object, entity, or other mechanism for holding money or performing transactions in any form, including, without limitation, electronic form. An account may be, for example, a credit card account, a prepaid card account, stored value card account, debit card account, check card account, payroll card account, gift card account, prepaid credit card account, charge card account, checking account, rewards account, line of credit account, credit account, mobile device account, or mobile commerce account. A financial institution may be, for example, a bank, other type of financial institution, including a credit card provider, for example, or any other entity that offers accounts to customers. An account may or may not have an associated card, such as, for example, a credit card for a credit account or a debit card for a debit account. The account card may be associated or affiliated with one or more social networking sites, such as a co-branded credit card.

As used herein, social networking site 107 may comprise a website and/or associated native mobile application that allows a user to create a social media account and provide user-specific information, including interests, and network with other users based on social connections. Examples of social networking sites may include, without limitation, Facebook, MySpace, Google+, LinkedIn, Twitter, Pintrest, Yelp, Foursquare, or the like. Social networking site 107 may maintain user accounts holding social media data for an account holder, such as, for example, user name, user phone number, user address, user email address, user occupation, and/or user location information.

As used herein, the term "Executor" refers to an individual or entity that creates and manages a group fund account, as will be described herein. The term "Group member" refers to an individual or entity who has agreed to link his financial account to the group fund account in order to contribute funds to the group fund account. In various embodiments, device 102 and device 109 may be the same or similar devices, but the role of the individual or entity that operates said device. The role of device 102 and device 109 automatically may be determined based on whether the user is the Executor or a group member. In various embodiments, all members other than the Executor may be identified as group members. Also, the Executor may be a group member with administrative privileges to administer the group fund account. Devices 102 and 109 may be any computer device, or communications device including, e.g., a server, a network appliance, a personal computer (PC), a workstation, a mobile device, a phone, a handheld PC, a personal digital assistant (PDA), a thin client, a tablet computer, a smartphone, a fat client, an Internet browser, or other device. Non-limiting examples of a smartphone include an iPhone or an Android-enabled phone. Devices 102 and 109 also may be tablet computers. Non-limiting examples of a tablet computer include an iPad, Kindle Fire, Playbook, Touchpad, and the like.

Figure 3:
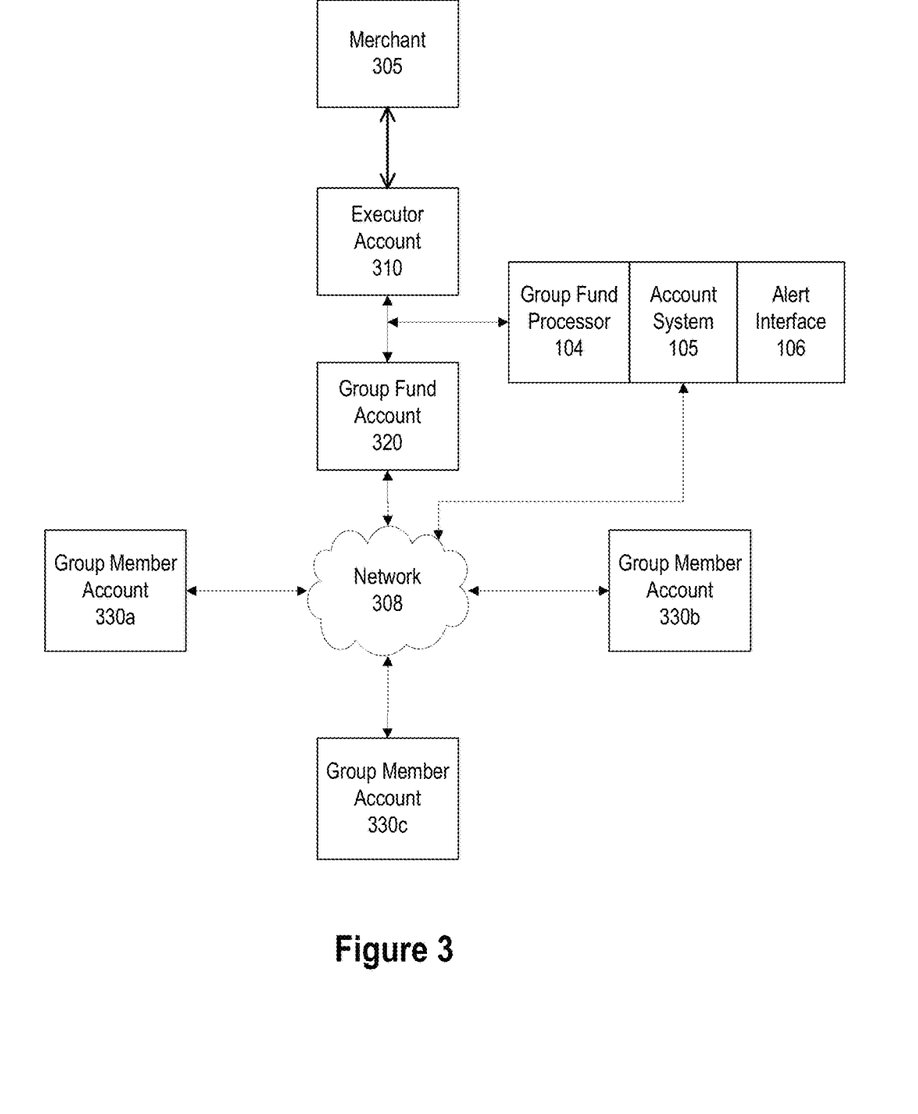
FIG. 3 depicts a schematic diagram of a system for providing a group fund account to a group of users, according to an example embodiment of the disclosure.

The user of Executor device 102 may sign up to be the Executor for a new group card fund. The user may access this service using, for example, group fund app 103, which may be, for example, a native mobile banking application, on device 102. The features and functionality of group fund app 103 may be integrated into mobile banking application provided by financial institution 101. Group fund app 103 may be a stand-alone application capable of executing on device 102. In various embodiments, group fund app 103 may be provided by social networking site 107. Group fund processor 104 may enable a user to create a new group fund account using, for example, various interfaces associated with group fund app 103. FIG. 3 shows an example embodiment of the relationships between the various accounts in the present disclosure. Group fund processor 104 may enable a user to create group fund account 320 and associate it with the user of device 102 using, for example, various interfaces of group fund app 103. The executor may create a username and password associated with group fund account 320. The group fund account may act as a short term deposit account. Group fund processor 104 may transmit a request to device 102 to provide account information for an executor account. The executor account may be a pre-existing financial account held by the executor (the user of user device 102). The executor account may be a checking account. The executor account may be a credit card account. The executor account may be a savings account. The executor account may be with financial institution 101 or some other third party financial institution. The executor may use device 102 to provide the account name, account number, routing number, username, password, and other information associated with the executor account.

Account system 105 may link or otherwise associate the group fund account to the executor account using the account information. In the embodiment shown in FIG. 3, group fund account 320 is linked to executor account 310. In various embodiments, the executor may link multiple executor accounts to the group fund account (e.g., the executor's credit card account and checking account may both be linked to the group fund account). Once the accounts are linked, group fund account 320 may enable the provision of funds to executor account 310, based on certain parameters. Group fund processor 104 may transmit a request for group fund account limits to executor device 102. The executor may select one or more group fund account limits using device 102 and transmit the selections to group fund processor 104, which associates the group fund account limits with the group fund account. Group fund account limits may include, for example and without limitation, transaction type, merchant identifiers, spend limit, transaction location restriction, transaction date and time limits and/or the like.

Transaction type limits allow the executor to set limits on the type of transaction that will be funded by the group fund account. For example, the executor may select "in-person transactions only" or "online transactions only". Merchant identifier limits allow the executor to designate certain merchants where the group fund account funds may be used to conduct transactions. The executor may supply the merchant's name and/or a merchant identifier, or select one or more merchants from a list provided by group fund processor 104. The executor may select specific merchants where the group fund account funds may not be used to conduct transactions. Spend limits allow the executor to set limits on the amount of funds from the group fund account that may be used to fund a given transaction. The spend limit may limit the amount of funds that may be used from the group fund account in a given day, week, month, etc. The transaction location limits may allow the executor to specify one or more locations where transactions may be conducted that can then be funded by the group fund account. The transaction location may be specified as a zip code, area code, city, state, latitude and longitude coordinate range, or other geographic location information. Transaction date and time limits allow the executor to specify a range of dates (or specific dates) associated with the group fund account. Only transactions that were conducted within that range of dates or on the specific dates can be funded using the group fund account. The executor may also set an expiration date for the group fund account. Once the expiration date passes, the group fund account may be closed by group fund processor 104, as will be described later on. The group fund account may have a recurring time limit (e.g., at the end of each month, group fund processor 104 may transmit a query to executor device 102 asking the executor whether to keep the group fund account open for the next month or close it).

After group fund processor 104 has created the group fund account, received the various limits from the executor device 102, and account system 105 has linked the group fund account to an executor account, alert interface 106 may transmit one or more requests to executor device 102 to prompt the executor for contact information for one or more potential group members. The executor may provide, via executor device 102, for example, the contact information for one or more group members, such as the user of group member device 109. The executor may provide, via executor device 102, for example, a social media username for the potential group member if the group member has a social media account with social networking site 107. The executor may provide an email address or phone number associated with the one or more group members. Alert interface 106 may then generate one or more group member invitations and send them to the group members based on the contact information. The invitation may be sent to the group member's social media account via social API 110 on a messaging platform specific to social networking site 107. The invitation could be a text, SMS, MMS, push notification or email sent directly to group member device 109. The invitation could be an in-app alert, for example, if the group member has a mobile banking application with financial institution 101. In various embodiments, various security features enabled by the mobile banking application may be used to authenticate one or more group members. For example, push notification authentication techniques as shown in described in U.S. patent application Ser. No. 14/827,608 entitled "System and Method For Digital Authentication," filed on Aug. 17, 2015 and U.S. patent application Ser. No. 14/827,671, entitled "System and Method For Digital Authentication," filed on Aug. 17, 2015, both of which claim priority to U.S. Provisional Patent Application No. 62/037,710, filed on Aug. 15, 2014, the entire contents of each of which are incorporated herein by reference in their entirety, may be used to authenticate group members.

The invitation may include the name of the executor, information about the group fund account, information about any of the limits associated with the group fund account, a personal message from the executor, and a request for the group member to link one of his financial accounts to the group fund account. The invitation may include an initial funding amount, specifying an amount of funds that will be transferred from the group member's account to the group fund account if the group member accepts the invitation. Each invitation may include a different initial funding amount, or they may all include the same initial funding amount. The executor may select the initial funding amount for each invitation using group fund app 103.

The group member may view the invitation on his device, such as group member device 109. The invitation may be received as a text message, SMS, MMS, email, push notification social networking message, or application specific message. The invitation may be received on the group member's social media account on social networking site 107 via social linking API 110. Social linking API 110 may allow certain data to be transmitted through the social linking API 110 so that social networking site 107 may communicate with group fund processor 104, account system 105, alert interface 106 and/or financial institution 101. Social linking API 110 may prevent data other than approved data to be transmitted through the social linking API. For example, the social linking API 110 may only support user name, user e-mail address, user identification information, and/or user location information to be transmitted from the social networking site 107 to group fund processor 104, account system 105, alert interface 106 and/or financial institution 101. In various embodiments, social API 110 may be part of group fund processor 104, account system 105, alert interface 106 and/or financial institution 101.

The group member may respond affirmatively to the invitation using, for example, group member device 109. The group member also may deny the invitation. The group member may respond affirmatively but provide a different initial funding amount from the one requested by the executor. The invitation may include one or more interactive features that request the group member provide an account number and/or routing number associated with a financial account that he will use as a group member account. The group member may have an account with financial institution 101. The account may be with financial institution 112, or another third party entity. Account system 105 may receive the account information associated with the group member's account if the group member responds affirmatively. The group member may provide, using, for example group member device 109, a username and password associated with his account. The group member may provide a PIN number associated with his account. Account system 105 may receive this information and use it to link the group member's account to the group fund account. The group member may link multiple accounts to the group fund account. This link may use one or more transaction networks, such as a Peer-to-Peer network (P2P) or an ACH network (e.g., if the group member has an account with financial institution 112). The link may be internal within financial institution 101 (if the group fund account and the group member account are both provided by financial institution 101). Once the group member's account is linked to the group fund account, the group member's account may supply funds to the group fund account. FIG. 3 shows group member accounts 330a, 330b, and 330c being linked to group fund account 320. In this embodiment, the group member accounts 330a, 330b, and 330c may be linked via network 308, which may be a transaction network. One or more of group member accounts 330a, 330b, and 330c also may be provided by the same financial institution as group fund account 320, and may be internally linked.

Once the accounts are linked, if the executor included an initial funding amount in each invitation, the group fund account will be credited that amount from each group member account, and each group member account will be debited the initial funding amount. The group fund account may not have a card associated with it, and group fund processor 104 may block the group fund account from being used directly in any transaction (e.g., group fund processor 104 may block group fund account from being used to pay a merchant for goods or services.

When a group member agrees to the invitation, group fund processor 104 may prompt the group member to post information about their contribution to their social media account with social networking site 107. The social media post, for example, may include the funding amount, the purpose of the group fund account, any name the executor has associated with the group fund account, and the date and time. Similarly, when the executor first creates the group fund account, group fund processor 104 may prompt the executor to "post" this information to his social media account at social networking site 107. Executor and/or the group members may link their information to their social media accounts with social networking site. This linking, for example, may be accomplished using group fund processor 104 and/or social API 110. When a group member responds affirmatively to the initial invitation, the invitation may include an option allowing the group member to link his activity to his social media account with social networking site 107.

Once a group member has linked his account with the group fund account, the user may receive a username and password to access read-only information for the group fund account. The user may, for example, enter this at a web portal and/or in an application on his device (e.g., device 109), such as group fund app 103. When the user enters the username and password, the user may view a record of all transactions that have been funded by the group fund account, the names of all the group members, the name of the executor, the current balance in the group fund account, the amount he has contributed, the amounts contributed by others, and/or any limits associated with the group fund account.

The executor may then make one or more purchases using the executor account (or one or more of the executor accounts if the executor initially linked multiple accounts to the group fund account). This process will be described in connection with FIG. 3. The executor may make a purchase at merchant 305 using executor account 310 (which has been previously linked with group fund account 320). The purchase may be made using a card swipe using a card from executor account 310. The purchase may be an online purchase. The purchase may be in the form of a mobile payment using device 102. The purchase may be some other form of P2P payment.

Merchant 305 may charge executor account 310 for the transaction. Group fund processor 104 may receive the transaction data for the transaction from merchant 305, financial institution 101, and/or a third party payment processor. The transaction data may include the transaction amount, the transaction location, the date and time, the account number for executor account 310, the transaction category, and one or more merchant identifiers.

Group fund system 104 may analyze the transaction data and compare it to the one or more group fund limits associated with the group fund account 320 to determine if the transaction charge is part of the group activity. If the charge is related to the group activity, account system 105 may transfer the funds for the transaction amount from the group card account 320 into the executor account 310. For example, assume the group fund account has been limited to transactions between Jul. 2-Jul. 5, 2014. The spend limit on the account is $500 total over that date range. The location limit is Martha's Vineyard. If the executor uses executor account 310 to make a purchase on Jul. 3 for $100 of fireworks at a store in Martha's Vineyard, group fund account module 104 may approve the transaction because it meets the limits (assuming the remaining balance on the group fund account will be greater than $100 following the time of the transaction), and account system 105 may transfer $100 from group fund account 320 to executor account 310. The executor account 310 may be used to pay the merchant for the transaction, while the group fund account 320 may be used to reimburse the executor account 310 if the one or more group fund limits are satisfied. The executor account 310 may pay the merchant for the transaction regardless of whether the group fund limits are satisfied, as these are only used to determine whether the group fund account 320 reimburses the executor account 310.

In various embodiments, group fund processor 104 may automatically approve a transaction on executor account 310 to be funded by group fund account 320 if that transaction meets the limits set by the executor. In various embodiments, alert interface 106 may transmit an alert to executor device 102 in response to receiving the transaction data and request authorization of the transaction from the executor. Alert interface 106 may transmit the alert only if the transaction meets all the limits. Alert interface 106 may transmit the alert if the transaction fails to meet one or more limits. If the executor responds to the alert, using, for example, executor device 102, by authorizing the transaction, account system 105 may transfer the funds from group fund account 320 to executor account 310.

In various embodiments, if the amount of funds in group fund account 320 drops below a certain level, alert interface 106 may generate a low balance alert to be transmitted to executor device 102. The level may have been set by the executor when he created the group fund account. The level may be preprogrammed into group fund processor 104. The low balance alert may include an option allowing the executor to send an updated funding request to one or more group members, similar to the initial invitation. The updated funding request may include a funding amount (similar to the initial funding amount). When the members of the group receive the updated funding request, they would be able to click a button (or select some other interactive feature) to approve the funding request for the amount the executor has asked for, or deny the request. In various embodiments, the group member could enter a different funding amount instead of the amount requested by the executor. Account system 105 may receive the group members' responses to the updated funding request and may withdraw/transfer/charge/debit the approved funds from the group members' linked accounts (e.g., accounts 330a, 330b, and/or 330c) and deposit/credit those funds into the group fund account 320.

When the group fund account 320 is used to fund a transaction on executor account 310, each group member may receive an alert on his device and/or to his social media page. The alert may include the transaction information. The alert may inform the group member that the transaction was approved by the executor to be funded by group fund account 320. The alert may include the remaining balance on the group fund account 320.

In various embodiments, group fund app 103 may be integrated into social networking site 107. The executor may access the same services and perform the same actions using his social media account on social networking site 107.

Once a charge has been made and confirmed by the executor and/or group fund processor 104, group fund processor 104 may present the executor with the option of posting the transaction information to his social media account with social networking site 107. The post may include a description of the event, a personal message from the executor (e.g., "just bought dinner at the Bellagio!"). Other group members may have this option as well. Group fund system 104 may allow the executor and/or group members to attach one or more photos and/or videos to the post.

Group fund system 104 may automatically close the group fund account once the date limit is reached for the account (if a date limit was set by the executor). The executor may close the account in response to an alert from alert interface 106 that the date limit has been reached. Account system 105 may distribute any remaining funds in group fund account to the group members equally, or in proportion to the amounts each group member has contributed. Account system 105 may delete all account information associated with the group member accounts and the executor account so that the accounts are no longer linked to the group fund account.

Figure 2:
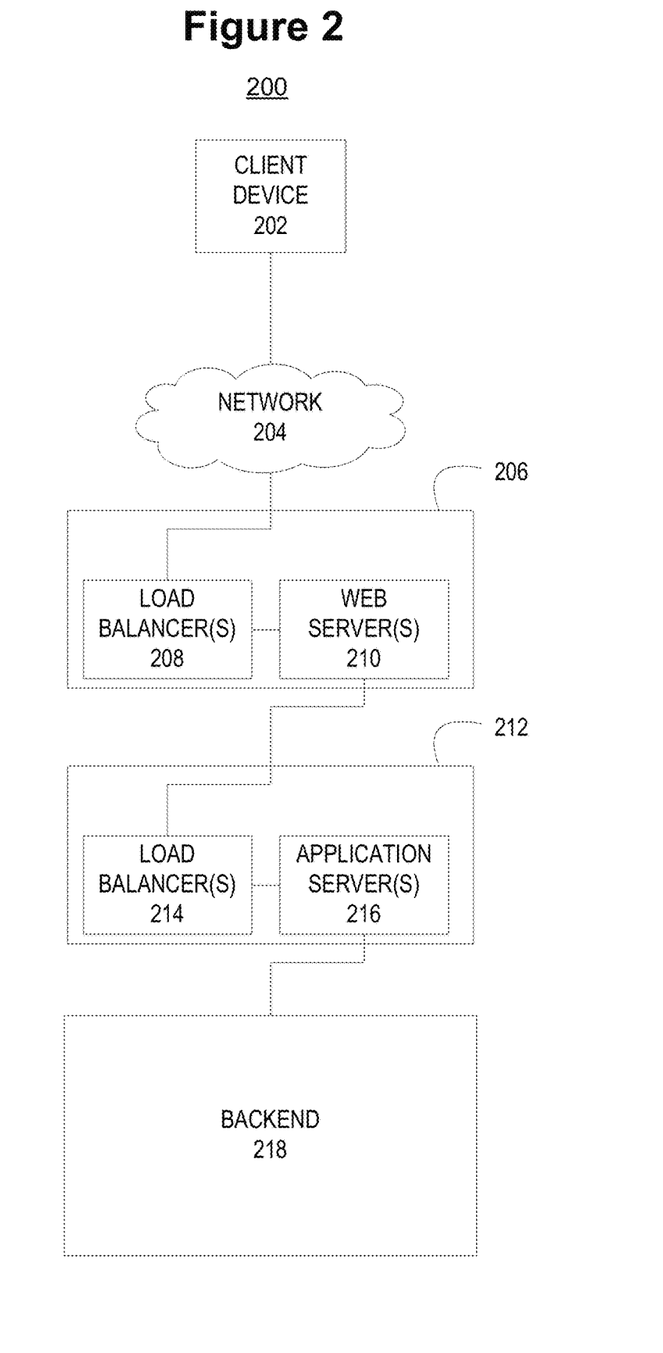
FIG. 2 depicts a schematic diagram of a system for providing a group fund account to a group of users, according to an example embodiment of the disclosure.

FIG. 2 depicts an example system 200 for providing a temporary group card fund to pay for purchases that satisfy certain parameters. As shown in FIG. 2, system 200 may include a client device 202, a network 204, a front-end controlled domain 206, a back-end controlled domain 212, and a backend 218. Front-end controlled domain 206 may include one or more load balancers 208 and one or more web servers 210. Back-end controlled domain 212 may include one or more load balancers 214 and one or more application servers 216.

Client device 202 may be a network-enabled computer. Client device 202 may be similar to executor device 102 and/or group member device 102. Client device 202 may be configured to execute one or more applications. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 200 may execute one or more software applications to enable, for example, network communications.

Client device 202 also may be a mobile device. For example, a mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device.

Network 204 may be one or more of a wireless network, a wired network, or any combination of a wireless network and a wired network. For example, network 204 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 204 may include, without limitation, telephone lines, fiber optics, IEEE Ethernet 902.3, a wide area network (WAN), a local area network (LAN) or a global network such as the Internet. Also, network 204 may support an Internet network, a wireless communication network, a cellular network, or the like, or any combination thereof. Network 204 may further include one network, or any number of example types of networks mentioned above, operating as a stand-alone network or in cooperation with each other. Network 204 may utilize one or more protocols of one or more network elements to which they are communicatively couples. Network 204 may translate to or from other protocols to one or more protocols of network devices. Although network 204 is depicted as a single network, it should be appreciated that according to one or more embodiments, network 204 may comprise a plurality of interconnected networks, such as, for example, the Internet, a service provider's network, a cable television network, corporate networks, and home networks.

Front-end controlled domain 206 may be implemented to provide security for backend 218. Load balancer(s) 208 may distribute workloads across multiple computing resources, such as, for example computers, a computer cluster, network links, central processing units or disk drives. In various embodiments, load balancer(s) 208 may distribute workloads across, for example, web server(S) 210 and/or backend 218 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 208 and 214 may include software that monitoring the port where external clients, such as, for example, client device 202, connect to access various services of a financial institution or third party (such as system 100 shown in FIG. 1), for example. Load balancer(s) 208 may forward requests to one of the application servers 216 and/or backend 218 servers, which may then reply to load balancer 208. This may allow load balancer(s) 208 to reply to client device 202 without client device 202 ever knowing about the internal separation of functions. It also may prevent client devices from contacting backend servers directly, which may have security benefits by hiding the structure of the internal network and preventing attacks on backend 218 or unrelated services running on other ports, for example.

A variety of scheduling algorithms may be used by load balancer(s) 208 to determine which backend server to send a request to. Simple algorithms may include, for example, random choice or round robin. Load balancers 208 also may account for additional factors, such as a server's reported load, recent response times, up/down status (determined by a monitoring poll of some kind), number of active connections, geographic location, capabilities, or how much traffic it has recently been assigned.

Load balancers 208 may be implemented in hardware and/or software. Load balancer(s) 208 may implement numerous features, including, without limitation: asymmetric loading; Priority activation: SSL Offload and Acceleration; Distributed Denial of Service (DDoS) attack protection; HTTP compression; TCP offloading; TCP buffering; direct server return; health checking; HTTP caching; content filtering; HTTP security; priority queuing; rate shaping; content-aware switching; client authentication; programmatic traffic manipulation; firewall; intrusion prevention systems.

Web server(s) 210 may include hardware (e.g., one or more computers) and/or software (e.g., one or more applications) that deliver web content that can be accessed by, for example a client device (e.g., client device 202) through a network (e.g., network 204), such as the Internet. In various examples, web servers, may deliver web pages, relating to, for example, online banking applications and the like, to clients (e.g., client device 202). Web server(s) 210 may use, for example, a hypertext transfer protocol (HTTP or sHTTP) to communicate with client device 202. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP and web server 210 may respond with the content of that resource or an error message if unable to do so. The resource may be, for example a file on stored on backend 218. Web server(s) 210 also may enable or facilitate receiving content from client device 202 so client device 202 may be able to, for example, submit web forms, including uploading of files.

Web server(s) also may support server-side scripting using, for example, Active Server Pages (ASP), PHP, or other scripting languages. Accordingly, the behavior of web server(s) 210 can be scripted in separate files, while the actual server software remains unchanged.

Load balancers 214 may be similar to load balancers 208 as described above.

Application server(s) 216 may include hardware and/or software that is dedicated to the efficient execution of procedures (e.g., programs, routines, scripts) for supporting its applied applications. Application server(s) 216 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 216 may act as a set of components accessible to, for example, a financial institution or other entity implementing system 200 and/or system 100, through an API defined by the platform itself. For Web applications, these components may be performed in, for example, the same running environment as web server(s) 210, and application servers 216 may support the construction of dynamic pages. Application server(s) 216 also may implement services, such as, for example, clustering, fail-over, and load-balancing. In various embodiments, where application server(s) 216 are Java application servers, the web server(s) 210 may behaves like an extended virtual machine for running applications, transparently handling connections to databases associated with backend 218 on one side, and, connections to the Web client (e.g., client device 202) on the other.

Backend 218 may include hardware and/or software that enables the backend services of, for example, a financial institution or other entity that maintains and distributes a system similar to system 200 and/or system 100. For example, backend 218 may include, a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, a group fund system (e.g., system 100 shown in FIG. 1) and the like. Backend 218 may be associated with various databases, including account databases that maintain, for example, customer account information, product databases that maintain information about products and services available to customers, content databases that store content associated with, for example, a financial institution, and the like. Backend 218 also may be associated with one or more servers that enable the various services provided by system 200. Backend 218 may be associated with one or more servers that enable the various services provided by system 100.

Figure 4:
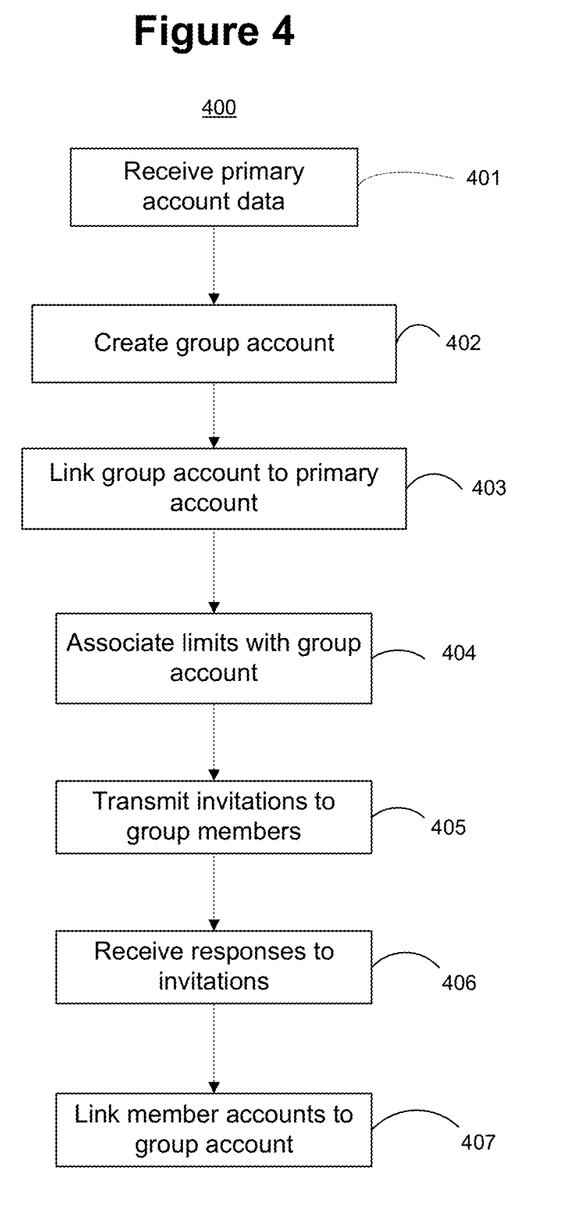
FIG. 4 depicts a schematic diagram of a method for creating a group fund account and associating it with a group of users, according to an example embodiment of the disclosure.

FIG. 4 is a flow chart illustrating a method for creating a group fund account for one or more group members. The method 400 shown in FIG. 4 can be executed or otherwise performed by one or more combinations of various systems. The method 400 as described below may be carried out by the system for providing a group fund account to one or more group members, as shown in FIGS. 1-3, by way of example, and various elements of that system are referenced in explaining the method of FIG. 4. Each block shown in FIG. 4 represents one or more processes, methods, or subroutines in the example method 400. Referring to FIG. 4, the example method 400 may begin at block 401.

At block 401, primary account data may be received. The primary account data may be received at a financial institution from a user device associated with a user who will control the group fund account as the executor. In various embodiments, a social linking API may be used in transmitting the primary account data from a user device to a financial institution. The primary account data may include, for example, an account number, a routing number, and a username and password for the primary account. In this example, the primary account may be a checking account held by user A. In various embodiments, the executor may provide account data for multiple primary accounts.

At block 402, a group fund account may be created. The group fund account may be created and maintained by a financial institution. The group fund account may be created in connection with a social linking API for example. The group fund account may be a "pay to" account that will be linked to the primary account. The group fund account may have an account number, but may be restricted so that it cannot be used to pay for any goods or services directly.

At block 403, the group fund account may be linked to a primary account. For example, a financial institution may link a group fund account to a primary account of an executor. Once the accounts are linked, the group fund account may be used to fund certain transactions conducted using the primary account. In various embodiments, the group fund account may be linked to multiple primary accounts (if, for example, the executor provided account information for multiple primary accounts).

At block 404, one or more limits may be associated with the group fund account. User A may set the limits for the group fund account. User A may create a name for the group fund account. In this example, the group fund account will be used to fund expenses on a group ski trip to Colorado. User A may set a total spend limit for the group fund account at $1,000. User A may set a date limit of Dec. 5-Dec. 8, 2014. User A may set a location limit of the zip code where the ski resort is located. User A may limit the group fund account to be used for in-person, credit transactions. The limits may be associated with the group fund account. In various embodiments where the executor has linked multiple primary accounts to the group fund account, the limits on the group fund account may vary depending on the primary account.

At block 405, invitations may be transmitted to potential group members. A financial institution may use, for example, an alert interface to transmit the notification to the users. The potential group members may be selected by user A. The invitations may be sent as text messages, SMS, MMS, push notification, email, or through one or more social networking platforms. The invitation may include the name of the group fund account, a description of the purpose, a description of the one or more limits associated with the account, and an initial funding amount. The initial funding amount may be set by user A. In this example, the invitation is sent to four individuals—user B, user C, user D, and user E. Each invitation includes an initial funding amount of $250. The invitation may include one or more interactive features allowing the recipient to accept the invitation, decline it, or accept it, but with a different initial funding amount using, for example, a group member device. The interactive features also request account information from each group member.

At block 406, the responses to the invitations may be received. In this example, user B, user C, user D, and user E all accept the invitation. Each response may include account information for an account held by the responding user. The account information may include an account name, an account number, a routing number, a username and password associated with the account, the name of the bank, etc.

At block 407, each group member account may be linked to the group fund account using the account information. Continuing with the previous example, user B's account is linked to the group fund account. User B's account is provided by the same financial institution as the group fund account, and $250 is automatically transferred from user B's account to the group fund account once the accounts are linked. User C's account may be provided by a different financial institution. User C's account may be linked over a transaction network, and $250 may be debited from user C's account and credited to the group fund account. User D's and user E's accounts may be similarly linked to the group fund account. Continuing with the previous example, once all four accounts are linked to the group fund account, the balance on the group fund account will be $1,000.

Figure 5:
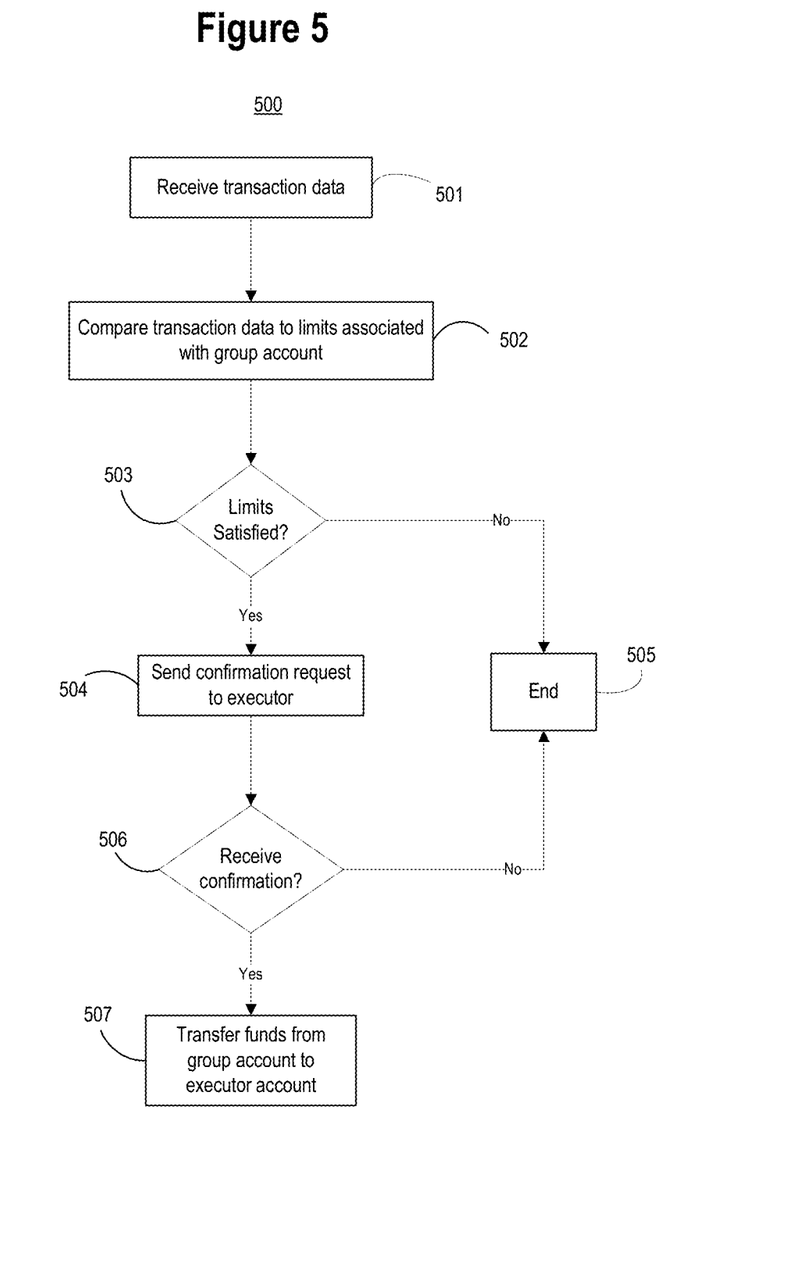
FIG. 5 depicts a schematic diagram of a method for funding a group fund account, according to an example embodiment of the disclosure.

FIG. 5 is a flow chart illustrating a method for funding a transaction using a group fund account. The method 500 shown in FIG. 5 can be executed or otherwise performed by one or more combinations of various systems. The method 500 as described below may be carried out by the system for providing a group fund account to one or more group members, as shown in FIGS. 1-3, by way of example, and various elements of that system are referenced in explaining the method of FIG. 5. Each block shown in FIG. 5 represents one or more processes, methods, or subroutines in the example method 500. Referring to FIG. 5, the example method 500 may begin at block 501.

At block 501, transaction data may be received at, for example, a financial institution via one or more financial transaction/authorization networks. Continuing with the previous example, the transaction data may be related to a purchase made by user A using a credit card associated with the primary account. The purchase may be made at the ski resort in Colorado. The purchase may be for $200 in lift tickets. The purchase may be made on December 6. The transaction data may include the purchase amount ($200), the date and time, the location of the purchase, a merchant identifier, the transaction type, the credit card number, and other data associated with the purchase and/or user A.

At block 502, the transaction data may be compared with the one or more limits associated with the group fund account using, for example, a group fund processor. Continuing with the previous example, the limits include a location limit (the zip code in Colorado where the ski resort is located), a date limit (transactions between December 5 and December 8), a transaction type limit (in-person credit card transactions), and a total spend limit (no more than $1,000 total during the life of the group fund account). At block 503, if the transaction data satisfies all of the limits, method 500 may proceed to block 504. If the transaction data fails to satisfy the limits, method 500 may proceed to block 505 where it ends. For example, if the $200 purchase was made at a gas station in Kansas, this would fail to satisfy the location limit, and the method would end, meaning the transaction would not be funded by the group account (i.e., the primary account would not be reimbursed for the cost of the purchase by the group fund account). In this example, the transaction data satisfies the limits placed on the account, and method 500 proceeds to block 504.

At block 504, a confirmation request may be transmitted to the executor via a network using, for example, an alert interface. For example, an alert interface may use a push notification to transmit the request to the executor. In so doing, push notification authentication may be used to authenticate the executor to the financial institution, for example. In various embodiments, block 504 may be omitted from the method. In other embodiments, block 504 may be placed before block 505 and after block 503. In this example, user A may receive a confirmation request. The confirmation request may be a text message, SMS, MMS, email, and/or a message sent on a social networking platform to user A's social media account(s). The confirmation request may include the transaction data and request that user A approve or deny the transaction. In various embodiments, user A may approve the transaction, but select a different reimbursement amount (instead of the transaction amount, the primary account would then be reimbursed from the group fund account based on user A's selection).

At block 506, if confirmation of the transaction from user A is received by the financial institutiuon, method 500 may proceed to block 507. If the user does not confirm the transaction, method 500 may proceed to block 505 and end.

At block 507, the appropriate funds from the group fund account may be transferred to the primary account using, for example, the group fund processor. The transferred funds may be for the transaction amount. The transferred funds may be for a different amount (based on user A's selection). In this example, method 500 may transfer $200 from the group fund account to user A's primary account (the checking account). The transfer may be an internal bank transfer. The transfer may be conducted over a transaction network. The balance on the group fund account may be updated after the $200 is transferred out.

In the preceding specification, various preferred embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:

1. A system comprising:
a group fund processor having a communications interface that receives account data associated with a primary account from a first device over a network, the first device including a mobile application configured to establish a secure connection with the group fund processor and being configured to enable an executor to create a group fund account including a recurring time limit, the mobile application being associated with a social networking platform, the group fund processor configured to associate one or more limits with the group fund account based on at least one selection received from the first device, wherein the group fund processor is configured to transmit a query to, and receive input responsive to the query from, the first device indicating whether the group fund account should close at a time associated with the recurring limit;
an alert interface that transmits an electronic invitation including a description of a first amount to a second device of an invited user over the network and receives a response from the second device of the invited user to the at least one invitation via the network, wherein the response includes account data associated with a group member account of the invited user; and
an account processor that links the group fund account to the primary account so that the group fund account funds the primary account, and links the group member account of the invited user to the group fund account so that the first amount is transferred from the group member account of the invited user to the group fund account, the mobile application of the first device further configured to enable the invited user to interact with the group fund processor as a group member, the group fund processor being further configured to prompt the group member to post information associated with the first amount via a mobile application of the second device to a social media account associated with the social networking platform.

2. The system of claim 1, wherein the group fund processor receives transaction data associated with a purchase made using the primary account via a transaction processing network and compares the transaction data to the one or more limits associated with the group fund account;
and wherein the alert interface transmits via the network a confirmation request to the first device associated with the primary account based on the results of the comparison and receives a response to the confirmation request from the first device; and
wherein the account processor transfers a specified amount from the group fund account to the primary account based on at least one of the transaction data and the response to the confirmation request.

3. The system of claim 1, further comprising a social linking application programming interface that interfaces with the group fund processor.

4. The system of claim 1, wherein the mobile application of the first and second devices are associated with at least one financial institution.

5. The system of claim 4, wherein the group fund processor, account processor and alert interface are integrated into the at least one financial institution.

6. The system of claim 1, wherein the electronic invitation is transmitted to the second device via the network using short message service or push notification.

* * * * *